(12) United States Patent
Backhaus et al.

(10) Patent No.: US 12,227,286 B2
(45) Date of Patent: Feb. 18, 2025

(54) METHOD OF AND TRANSONICALLY OPERATING AIRCRAFT HAVING DEVICES FOR SUPPRESSING AEROELASTIC INSTABILITIES

(71) Applicant: Deutsches Zentrum für Luft—und Raumfahrt e.V., Bonn (DE)

(72) Inventors: Kai Backhaus, Wolfenbüttel (DE); Jürgen Arnold, Diemarden (DE); Holger Hennings, Rosdorf (DE); Lorenz Tichy, Göttingen (DE)

(73) Assignee: Deutsches Zentrum für Luft—und Raumfahrt e.V., Bonn (DE)

( * ) Notice: Subject to any disclaimer, the term of this patent is extended or adjusted under 35 U.S.C. 154(b) by 186 days.

(21) Appl. No.: 17/742,926

(22) Filed: May 12, 2022

(65) Prior Publication Data

US 2022/0324553 A1 Oct. 13, 2022

Related U.S. Application Data

(63) Continuation of application No. PCT/EP2020/081465, filed on Nov. 9, 2020.

(30) Foreign Application Priority Data

Nov. 13, 2019 (DE) .................. 10 2019 130 596.9

(51) Int. Cl.
*B64C 21/02* (2006.01)
*B64C 21/00* (2023.01)
*B64C 23/04* (2006.01)

(52) U.S. Cl.
CPC .............. *B64C 21/02* (2013.01); *B64C 21/00* (2013.01); *B64C 23/04* (2013.01); *B64C 2230/00* (2013.01)

(58) Field of Classification Search
CPC ....... B64C 21/02; B64C 21/025; B64C 21/04; B64C 21/06; B64C 21/08; B64C 2230/04; B64C 2230/06
See application file for complete search history.

(56) References Cited

U.S. PATENT DOCUMENTS

| 4,671,474 | A | * | 6/1987 | Haslund | .................. B64C 21/06 244/209 |
| 5,335,885 | A | | 8/1994 | Bohning | |

(Continued)

FOREIGN PATENT DOCUMENTS

| DE | 10305973 B3 | 5/2004 |
| DE | 10332665 B3 | 1/2005 |

(Continued)

OTHER PUBLICATIONS

NASA, Speed Regimes: High Subsonic. Accessed on Mar. 20, 2009. web.archive.org/web/20090320070318/https://www.grc.nasa.gov/www/k-12/airplane/hisub.html (Year: 2009).*

(Continued)

*Primary Examiner* — Tye William Abell
*Assistant Examiner* — Justin Michael Heston
(74) *Attorney, Agent, or Firm* — Thomas | Horstemeyer, LLP

(57) ABSTRACT

In order to suppress aeroelastic instabilities on a transonically operating aircraft comprising a pair of wing halves at which a transonic flow forms spatially limited supersonic flow regions that each, in a main flow direction of the flow, end in a compression shock, a boundary layer of the flow is temporarily thickened-up in at least one supersonic flow region at at least one of the two wing halves, when approaching a flight envelope of the aircraft with increasing flight Mach number of the aircraft. The boundary layer of the flow is thickened-up to such an extent that the compression shock at the end of the respective supersonic flow region at the (Continued)

present flight Mach number of the aircraft induces a separation of the boundary layer of the flow from the wing half.

24 Claims, 12 Drawing Sheets

(56) References Cited

U.S. PATENT DOCUMENTS

2003/0205640 A1  11/2003  Bowcutt
2021/0253226 A1* 8/2021  Nagashiki ................ B64C 3/30

FOREIGN PATENT DOCUMENTS

| EP | 0126199 A | 11/1984 |
| EP | 0126199 A1 * | 11/1984 |
| EP | 0126199 B | 11/1984 |
| EP | 0558904 A1 | 9/1993 |
| EP | 1506922 A1 | 2/2005 |
| WO | WO-2005049424 A2 * | 6/2005 |

OTHER PUBLICATIONS

Neil D. Sandham, Shock-Wave/Boundary-Layer Interactions, Sep. 8, 2011 Publishing data available at :[https://www.sto.nato.int/publications/Pages/peopleresults.aspx?k=stoauthorexternal:sandham,] PDF found at:[https://www.sto.nato.int/publications/STO%20Educational%20Notes/RTO-EN-AVT-195/EN-AVT-195-05.pdf] (Year: 2011).*

English Translation of IPRP in co-pending, related PCT Application No. PCT/EP2020/081465, mailed May 17, 2022.

* cited by examiner

METHOD OF AND TRANSONICALLY OPERATING AIRCRAFT HAVING DEVICES FOR SUPPRESSING AEROELASTIC INSTABILITIES

CROSS REFERENCE TO RELATED APPLICATIONS

This application is a continuation of International Application PCT/EP2020/081465 with an international filing date of Nov. 9, 2020 and claiming priority to co-pending German Patent Application No. DE 10 2019 130 596.9 entitled "Verfahren zum Unterdrücken von aeroelastischen Instabilitäten an transsonisch operierenden Flugzeugen and Flugzeug mit Einrichtungen zur Durchführung des Verfahrens mittels direktem Eingriff in die aerodynamische Grenzschicht", filed on Nov. 13, 2019.

FIELD OF THE INVENTION

The invention relates to a method of suppressing aeroelastic instabilities on a transonically operating aircraft which has a pair of wing halves at which a transonic flow forms spatially limited supersonic flow regions that each, in a main flow direction of the flow, end in a compression shock. Further, the invention relates to an aircraft comprising a pair of wing halves at which a transonic flow forms spatially limited supersonic flow regions that each, in a main flow direction of the flow end in a compression shock, and devices for suppressing aeroelastic instabilities on the transonically operating aircraft.

If, in this description, a wing half is mentioned, this may particularly be an airfoil half of the respective aircraft but also a half of another wing, like, for example, a wing of an elevator of the respective aircraft.

BACKGROUND OF THE INVENTION

Transonically operating aircraft may only be flown without danger within a defined flight envelope which is composed of different physical limits. In the area of flight Mach numbers in the high subsonic range, the flight envelope is significantly defined by aeroelastic instabilities. The occurrence of these aeroelastic instabilities at flight Mach numbers in the high supersonic range may be explained by compressibility effects at the upper side of the wing halves which arise when the flow over the wing halves exceeds a critical flight Mach number. The critical flight Mach number is the flight Mach number of an undisturbed flow incident on the wing halves at which the local flow over the wing halves reaches sound velocity for a first time. The critical flight Mach number is significantly depending on the profile geometry and the wing sweep of the airfoils. At flight Mach numbers above the critical flight Mach number, a transonic flow field with a local supersonic region arises at first at the low pressure side and with increasing flight Mach number also on the high pressure side of the wing halves. This supersonic region, as a rule, ends in a compression shock which extends orthogonal to the surface of the respective wing half and which induces shock waves over the surface of the wing half. These shock waves result in a strong increase of the aerodynamic drag. In addition to that increase of drag, the compression shock may induce different aeroelastic instabilities which may particularly be related to the movement of the compression shock with a deformation of the respective wing half and to shock-boundary-interactions. These aeroelastic instabilities are the cause of phenomenons designated as transonic flutter, buzz and buffeting and may, due to the introduction of energy in form of excited structure vibrations, result in damages to or even destruction of the aircraft. The local drop of a critical flutter velocity in the transonic range resulting from these instability effects is called transonic dip and defines the maximum allowable flight Mach number or maximum normal operation Mach number of the flight envelope.

When analyzing the occurrence of the transonic flutter in detail, a clear influence of the strength and the position of the compression shock onto the instationary aerodynamic forces and moments which result in the instabilities becomes apparent. Particularly, the movement of the compression shock over the respective wing half at flight Mach numbers in the high subsonic range with the wing deformation may be regarded as the causal mechanism of the transonic flutter, the compression shock often being positioned behind the elastic axis of the wing half. Particularly in so-called supercritical profiles which are usual in transonically operating transport aircraft, there is a distinct movement of the compression shock with the angle of attack of the respective profile.

With higher flight Mach numbers beyond the transonic dip, there is a separation of the boundary layer of the flow from the wing half which is induced by the compression shock and which results in a movement of the compression shock with the angle of attack a of the respective profile which is opposite to the movement described above. This opposite or inversed movement of the compression shock reduces the excitation of flutter so that the critical flutter flight Mach number increases again.

In order to reduce the wave resistance associated with a limited supersonic flow region at a surface of a body in a flow, German patent DE 103 32 665 B3 and European patent EP 1 506 922 B1 belonging to the same patent family teach to provide disturbance bodies generating weak compression shocks at the surface of the body in the flow upstream of a compression shock at the end of the supersonic flow region. Particularly, groups of the disturbance bodies which are arranged at distances orthogonal to the flow direction, which extend in flow direction and which each consist of a plurality of small disturbance bodies are arranged on the surface of the body in the flow. Within each group of the disturbance bodies, the flow velocity is kept below the sound velocity by means of the disturbance bodies. Thus, the information on the increase in pressure in the compression shock is forwarded within each group of the disturbance bodies in the direction opposite to the flow, which is per se impossible within a supersonic flow. Thus, the boundary layer enclosing the body in the flow gets thicker locally, and the jump in pressure coming with the strong compression shock excites weak compression shocks, through which the supersonic flow passes before it gets to the strong compression shock. With regard to the overall energy balance, the associated stepwise deceleration of the supersonic flow is more favorable than the deceleration of the supersonic flow in the area of the strong compression shock only.

Shock inducing means for reducing losses which are associated with a strong compression shock at the end of a supersonic flow region of a flow flowing over a surface, are also known from German patent DE 103 05 973 B3. Here, the shock inducing means induce at least one weak shock in the flow so that at least a part of the flow which makes up 20% of the cross-section of the flow passing through the supersonic flow region, is slowed down by means of the at least one weak shock prior to getting to the strong compression shock. The shock inducing means include at least one shock inducing body which is arranged at a distance to the surface within the supersonic flow region. With a suitable shape, the body, directly at its body surface or at a boundary layer of the flow attached to the body surface or at a boundary of a separation bubble of the flow starting from the body, induces weak shocks which slow down the flow. Here, the boundary layer at the surface over which the supersonic flow region is formed is not, or just indirectly, disturbed.

An airfoil for aircraft with supercritical profile is known from European patent application publication EP 0 126 199 A1 and European patent EP 0 126 199 B1 belonging to the same patent family. Here, a device for influencing the compression shock arising is provided on the upper side of the airfoil in a defined range of the profile depth. The device is configured as a ventilation device for equalizing the difference in pressure between a supersonic flow region and a subsonic flow region. The ventilation device consists of a perforated wall strip which extends in direction of the wingspan with an equalization chamber arranged underneath. The equalization between the supersonic flow region and the subsonic flow region is achieved by means of a secondary flow forming automatically such that a part of the boundary layer downstream of the compression shock is sucked in and blown out again upstream of the compression shock. This secondary flow results in an additional thickening of the boundary layer upstream of the compression shock and further results in a reduction of the separation tendency of the boundary layer downstream of the compression shock. Due to the additional boundary layer thickening, there is a stronger curvature of the displacement flow line in the shock area, and, as a result a flatter increase in pressure in the shock area and a stronger post expansion downstream of the compression shock resulting in a shift of the shock induced boundary layer separation towards higher pre-shock Mach numbers. Further, the additional boundary layer thickening results in stronger compression waves upstream of the shock which tend to reduce the pre-shock Mach number. By means of the ventilation device, an "off-design-area" is also expanded because the shock induced separation is delayed towards higher pre-shock Mach numbers and, thus, because both the steep increase in aerodynamic drag and a buffet Mach boundary are shifted towards higher lift values.

There still is a need of a method of suppressing aeroelastic instabilities on a transonically operating aircraft and of a transonically operating aircraft, in which the tendency to transonic flutter is reducible to such an extent that the flight envelope, due to a reduction of the transonic dip, is significantly expanded.

SUMMARY OF THE INVENTION

The present invention relates to method of suppressing aeroelastic instabilities on a transonically operating aircraft comprising a pair of wing halves at which a transonic flow forms spatially limited supersonic flow regions that each, in a main flow direction of the flow, end in a compression shock. The method comprises, in at least one supersonic flow region at at least one of the two wing halves, thickening-up a boundary layer of the flow temporarily when approaching a flight envelope of the aircraft with increasing flight Mach number of the aircraft. The boundary layer of the flow is thickened-up to such an extent that the compression shock at the end of the respective supersonic flow region at the present flight Mach number of the aircraft induces a separation of the boundary layer of the flow from the wing half.

The invention further relates to an aircraft comprising a pair of wing halves at which a transonic flow forms spatially limited supersonic flow regions that each end in a compression shock in a main flow direction of the flow, and devices for suppressing aeroelastic instabilities on the transonically operating aircraft. The devices for suppressing aeroelastic instabilities are configured for automatically thickening-up a boundary layer of the flow in at least one of the supersonic flow regions at at least one of the two wing halves to such an extent that the compression shock at the end of the respective supersonic flow region induces a separation of the boundary layer from the wing half at the present flight Mach number of the aircraft. Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
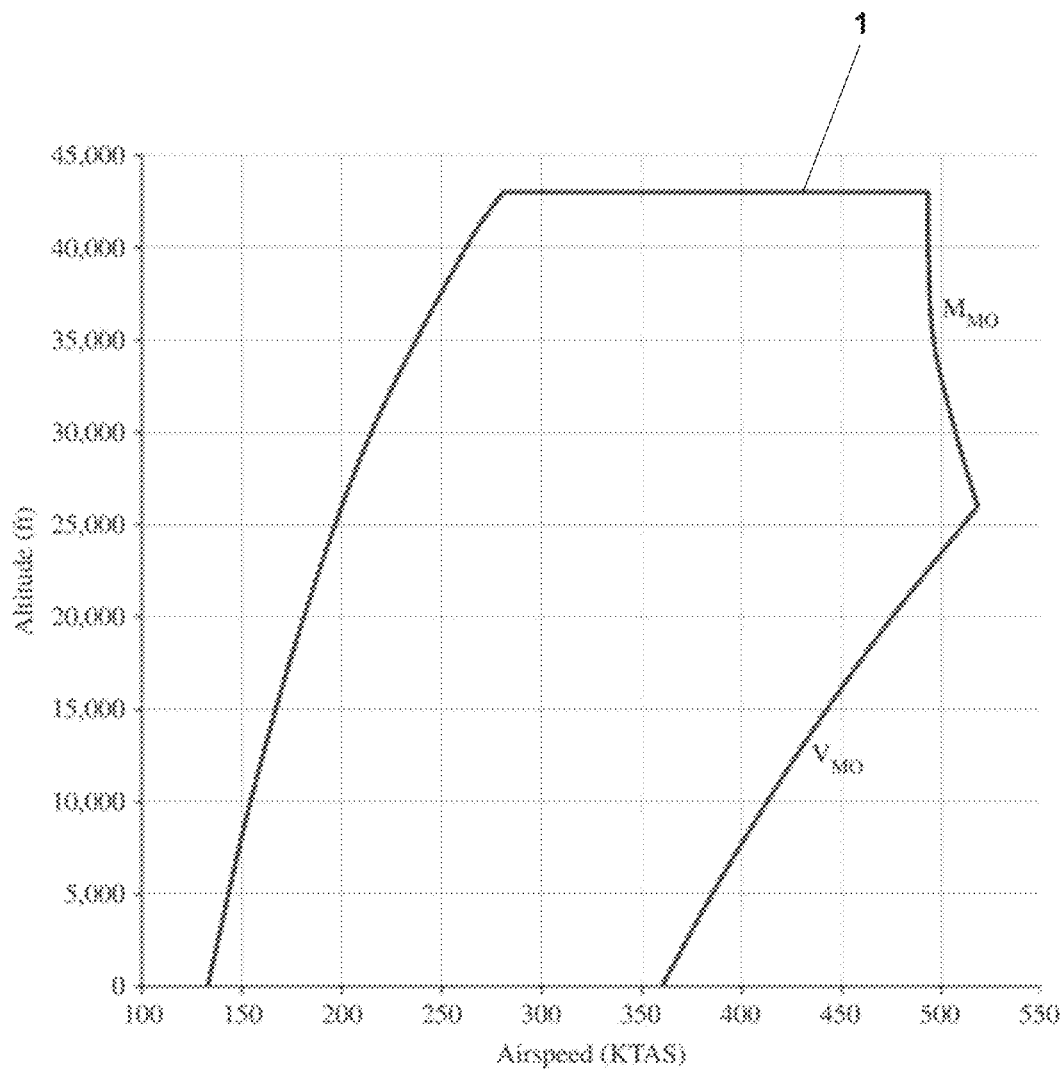
FIG. 1 is a schematic diagram of a flight envelope of an aircraft which is partially defined by a Maximum normal Operation Mach number $M_{MO}$.

In the method for suppressing aeroelastic instabilities on a transonically operating aircraft comprising a pair of wing halves at which a transonic flow forms spatially limited supersonic areas that each end, in a main flow direction of the flow, in a compression shock, in at least one of the supersonic flow regions at at least one of the two wing halves, a boundary layer of the flow is temporarily thickened-up to such an extent that it is ensured that the compression shock at the end of the respective supersonic flow region induces, i.e. definitively results in a separation of the boundary layer from the wing half. The boundary layer is only thickened-up temporarily when approaching a flight envelope of the aircraft with increasing flight Mach number of the aircraft.

The method is not only applicable with respect to a supersonic flow region at an upper side of an airfoil or at a low pressure side of any other wing half in order to avoid the excitation of transonic flutter by movement of the compression shock at the end of the supersonic flow region. With the same intention, the method may also be executed with respect to a supersonic flow region at an underside of an airfoil or at a high pressure side of any other wing half. As generally known, depending on the kind of the wing half, a transonic flow may also form a spatially limited supersonic flow region which ends in a compression shock and which may induce transonic flutter by movement of the compression shock at the high pressure side of the wing half.

By means of thickening-up the boundary layer already at the present flight Mach number of the aircraft, i.e. in the first approach of the aircraft to the critical flutter flight Mach number with increasing flight Mach number, such that the compression shock induces the separation of the boundary layer from the wing half, those flow conditions are enforced that are causal for the re-increase of the critical flutter velocity behind the transonic dip. The separation of the flow induced by the compression shock results in a movement of the compression shock with the angle of attack of the wing half which is opposite to a movement exciting transonic flutter. Practically, the shock induced separation leads to a movement of the compression shock with increasing angle of attack in forward or upstream direction, whereas, in excitation of transonic flutter, it moves backwards or downstream. Thus, the occurrence of the shock induced separation results in a significant reduction of the instationary aerodynamic forces and moments. As a consequence, the critical flutter Mach number or flutter Mach boundary is significantly increased.

The thickening-up of the boundary layer of the flow to such an extent that the compression shock at the end of the respective supersonic flow region, at the present flight Mach number of the aircraft, definitely induces a separation of the boundary layer from the wing half, applies a massive shock-boundary-interaction. This massive shock-boundary-interaction has the direct result that no reduction but a significant increase of the aerodynamic drag of the aircraft comes with the thickening-up of the boundary layer at the present flight Mach number. However, the boundary layer is not thickened up permanently but only temporarily when approaching the flight envelope with increasing flight Mach number, i.e. when approaching the transonic dip. Here, the temporarily increased aerodynamic drag is acceptable as it raises the critical flutter flight Mach number and thus allows for a further secure increase of the flight Mach number, often beyond the transonic dip that would occur without the thickening-up of the boundary layer. On the other side of the transonic dip, the thickening-up of the boundary layer may be stopped as the separation of the flow which inhibits the transonic flutter occurs here anyway.

Preferably, the thickening-up of the boundary layer with the intention of the shock induced flow separation from the respective wing half is such that the boundary layer separating at the foot of the compression shock re-attaches to the respective wing half downstream of the compression shock. This means that the boundary layer forms a closed separation bubble. Such a closed separation bubble results in more stable flow conditions around the respective wing half than with a boundary layer which does not re-attach to the respective wing half downstream of its point of separation.

It is preferred if the boundary layer of the flow re-attaches to the respective wing half over at least 5% of a local profile depth c of the respective wing half downstream of the separation bubble and upstream of a trailing wing edge of the respective wing half. It is even more preferred if the flow re-attaches over at least 10% of this local wing depth c to the respective wing half.

Measures for thickening-up a boundary layer are generally known to those skilled in the art. It belongs to this measures that an average velocity of the flow parallel to the surface of the respective wing half or a velocity of the flow parallel to the surface of the respective wing half at half the thickness of the boundary layer or an average kinetic energy of the flow in the boundary layer is reduced.

In order to achieve this reduction in practice, the flow parallel to the surface of the respective wing half may be slowed down in the boundary layer. Alternatively or additionally, an additional amount of air with low velocity parallel to the surface of the respective wing half may be introduced into the boundary area.

With respect to the location in wingspan direction, the boundary layer of the flow is preferably thickened-up in an outer half of the half wingspan of the respective wing half. Here, the highest variations of the angle of attack of the wing half with respect to the flow occur due to elastic deformations of the wing half, and, correspondingly, the danger of exciting transonic flutter by an interaction with the moving compression shock is the highest here.

Even if the boundary layer of the flow does not need to be thickened-up over the entire half wingspan but preferably concentrates to a part of the half wingspan, particularly to the outer half of the half wingspan, the boundary layer is not thickened-up only punctually. Practically, the boundary layer may be thickened-up within an intervention area which extends over 5% to 50% and particularly over 10% to 30% of the half wingspan of the respective wing half.

When viewed in the main flow direction of the flow, the boundary layer, at an upper side of an airfoil or more general at the low pressure side of the respective wing half, is preferably thickened-up within a profile depth range from 40% to 85% or even more preferably from 50% to 75% of a local profile depth c of the respective wing half behind the leading wing edge of the respective wing half. At the underside of an airfoil or more general at the high pressure side of the respective wing half, the boundary layer is preferably thickened-up within a profile depth range from 5% to 85% or even more preferred from 5% to 50% of the local profile depth c of the respective wing half behind the leading wing edge of the respective wing half, i.e. by trend a little upstream as compared to the low pressure side of the respective wing half.

The thickening-up of the boundary layer of the flow to such an extent that it is ensured that the compression shock at the end of the respective supersonic flow region induces a separation of the boundary layer from the wing half is, as a rule, achieved in that the boundary layer of the flow is thickened-up by at least 10% of its thickness prior to being thickened-up. Often, a thickening-up by at least 5% of the thickness of the boundary layer prior to being thickened-up is sufficient. As a rule, there is no need to thicken-up the boundary layer by more than 30% of its thickness prior to being thickened-up. As a boundary layer, with increasing Reynolds-number, thickens-up continuously, these percentages relate to a thickness of the boundary layer prior to being thickened-up at an upstream distance to the intervention area in which the boundary area is thickened-up of 5% of the local profile depth c and to a thickness of the thickened-up boundary layer at a downstream distance to the intervention area of 5 of the local profile depth. In absolute figures, the thickening-up will usually be sufficient, if the boundary layer is thickened-up to 10 mm thickness. Often, even a thickening-up to a thickness of the boundary layer of 5 mm will be sufficient. As a rule, a thickening-up to more than 100 mm proves not to be necessary.

The boundary layer of the flow may be thickened-up in the supersonic flow regions on the same side of both of the two wing halves or only in one of the supersonic flow regions on one side of one of the two wing halves. In fact, a single side intervention for suppressing the transonic flutter is often at least as effective with respect to avoiding the transonic flutter as a double side intervention but increases the aerodynamic drag of the aircraft by just the half. However, as the increase of the aerodynamic drag only occurs on one side, it induces a change in direction of the aircraft which has to be compensated for by a steering intervention.

With respect to the flight Mach number of the aircraft, the boundary layer of the flow is typically thickened-up at a flight Mach number in a range from 0.5 to 1.0, or more precisely over flight Mach numbers in a certain partial range of this range, i.e., for example from 0.7 to 0.85 to reduce the tendency to flutter indicated by the transonic dip exactly in this partial range.

In an aircraft comprising a pair of wing halves at which a transonic flow forms spatially limited supersonic flow regions that each end, in a main flow direction, in a compression shock, and devices for suppressing aeroelastic instabilities on the transonically operating aircraft, these devices for suppressing the aeroelastic instabilities are configured for automatically temporarily thickening-up the boundary layer of the flow as described above. For this purpose, the devices detect the approach of the aircraft to its flight envelope with increasing flight Mach number and then start the thickening-up of the boundary layer of the flow.

Typically, the aircraft is a transonically operating commercial or transport aircraft that has at least one of the following features. A wing sweep $\Phi_{0.25c}$ at 25% of the relative profile depth c of the respective wing half is higher than $-40°$ and smaller than $40°$. An aspect ratio $\Lambda=b^2/S$ of the wing halves is higher than 6 but smaller than 20, wherein b/2 is the half wingspan and S/2 is a wing area of the respective wing half. An aircraft model specific Maximum normal Operating Mach number $M_{MO}$ of the typically transonically operating commercial or transport aircraft is between 0.7 and 1.0.

The devices for thickening-up the boundary layer may include air exit points distributed in wingspan direction which are connected to activatable air supply channels. The air supply channels may be connected to motor driven or aerodynamically operated pressurized air sources. With motor driven pressurized air sources, the activatable air supply channels may be activated by switching on and off the motor of the respective pressurized air source. For activating and deactivating aerodynamically effective pressurized air sources, it is, as a rule, required to provide valves or flaps in the air supply channels.

Alternatively or additionally, elements which can be activated into a dynamically effective position may be provided at the wing halves for thickening-up the respective boundary layer. These elements, may, for example, be activatable spoilers by which the respective wing half may temporarily be provided with a step extending crosswise with respect to the main flow direction and stepping back along the main flow direction.

The aircraft may also have active flutter suppression devices which are configured for actively suppressing flutter of the wing halves. In this case, the devices for suppressing the aeroelastic instabilities described above may be provided for thickening-up the boundary layer in order to avoid an approach to the flight envelope when the active flutter suppression devices fail or are insufficient. Thus, the devices for thickening-up the boundary layer may be provided as a backup or a security solution in addition to the active flutter suppression devices so that the increased aerodynamic drag of the aircraft associated with thickening-up the boundary layer is even less relevant as it only occurs infrequently.

The devices of the aircraft may particularly be configured to recognize that the flight envelope is approached by comparing present flight parameters with a stored description of the flight envelope. The flight parameters and a flight condition of the aircraft within the flight envelope deduced therefrom may, for example, be determined by means of a flight envelope protection of the aircraft which is regularly provided and which anyway continuously determines the flight condition of the aircraft to keep it within the flight envelope.

Alternatively or additionally, the devices of the aircraft may be configured to recognize the approach to the flight envelope by means of evaluating signals from vibration sensors which detect vibrations of the wing halves in a frequency range from 0.5 Hz to 50 Hz and particularly from 1 Hz to 25 Hz. In these frequency ranges the transonic flutter occurs and announces itself by vibrations of increasing amplitude. The vibration sensors may be based on pressure, path, deformation or acceleration sensors.

Now referring in greater detail to the drawings, FIG. 1 depicts a flight envelope 1 of a transonically operating aircraft as its maximum altitude in foot plotted over its air speed in knot. Towards higher flight velocities, the flight envelope at lower altitudes and correspondingly higher air densities is defined by a Maximum normal Operation Velocity $V_{MO}$ and at higher altitudes and correspondingly lower air densities by a Maximum normal Operation Mach number $M_{MO}$. The Maximum normal Operation Mach number $M_{MO}$ is the maximum flight Mach number at which a so called transonic flutter does not occur at a sufficient security.

Figure 2:
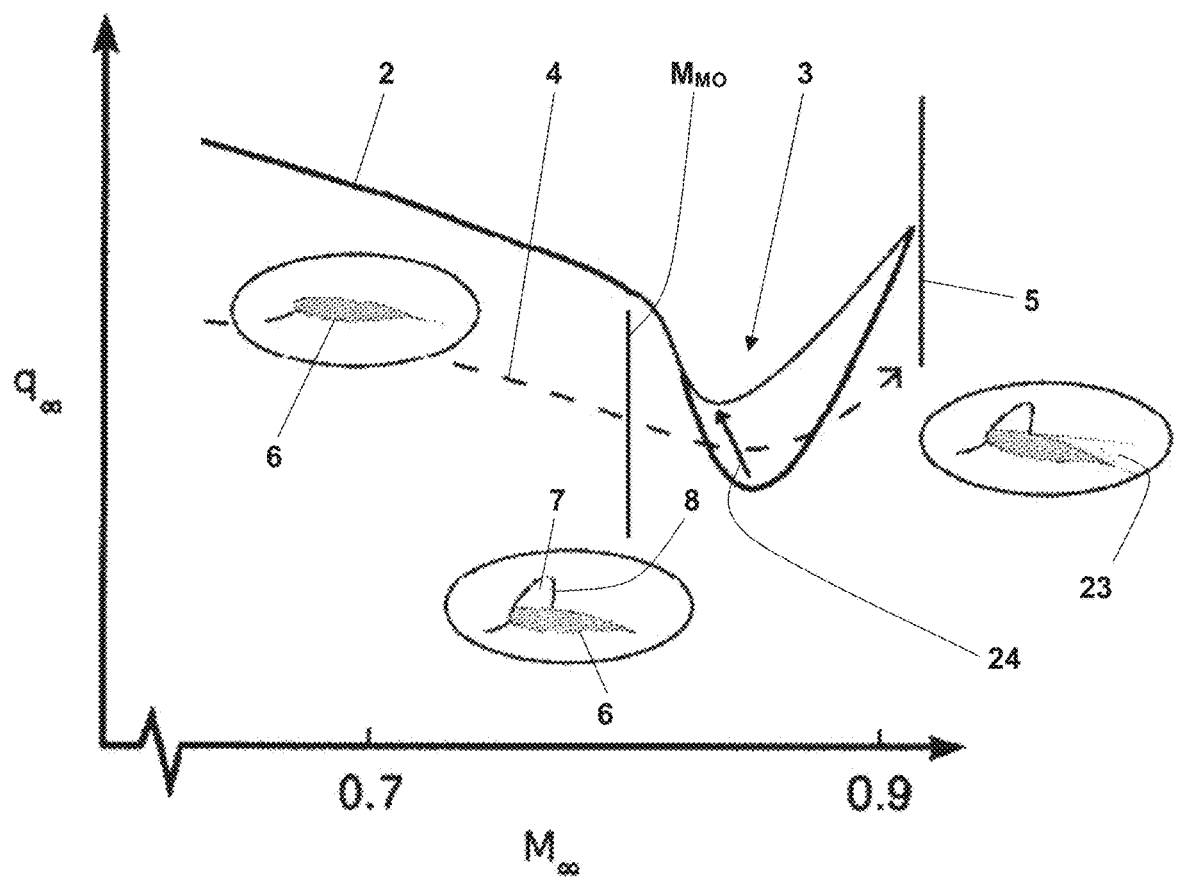
FIG. 2 is a schematic plot of a critical flutter dynamic pressure over the flight Mach number of an aircraft, which comprises a transonic dip.

In FIG. 2, a flutter dynamic pressure boundary 2 is plotted over the flight Mach number $M_\infty$. The flutter dynamic pressure boundary 2 indicates the dynamic pressure $q_\infty$ from which on the transonic flutter occurs at a certain flight Mach number $M_\infty$ of the aircraft. Thus, the flutter dynamic pressure boundary 2 delimits a stable area of the aircraft with regard to the dynamic pressure $q_\infty$ in upward direction. The flutter dynamic pressure boundary 2 is also a measure of a flutter velocity boundary from which on the transonic flutter occurs. At high transonic flight Mach numbers below the velocity of sound ($M_\infty=1$) the flutter dynamic pressure boundary 2 displays a so called transonic dip 3 in which the flutter dynamic pressure boundary 2 transiently drops. In order to avoid approaching or even exceeding the flutter dynamic pressure boundary 2 in the area of the transonic dip 3 when increasing the flight Mach number $M_\infty$ of the aircraft at a constant altitude along a curve 4, the Maximum normal Operation Mach number $M_{MO}$ is defined for this altitude.

Already in approaching the sound velocity ($M_\infty=1$), local supersonic flow regions 7 are formed above the wing halves 6 of the aircraft which each end in a strong compression shock 8. In transonic flutter, elastic vibrations of the wing halves 6 which result in variations of their angles of attack with respect to the flow are amplified by a movement of the compression shock with the angle of attack in flow direction. At higher flight Mach numbers $M_\infty$, this amplification is at first reduced and finally removed by an interaction of the strong compression shock 8 with the boundary layer of the flow at the wing halves, which at first results in a locally limited and then in a complete separation 23 of the boundary layer from the wing half 6. As a result, with higher flight Mach numbers $M_\infty$, the flutter dynamic pressure boundary 2 rises again. Behind the transonic dip, the stable area of the aircraft then ends at a buffet Mach boundary. Buffeting of the wing halves 6 starts when exceeding the buffet Mach boundary.

In order to suppress aeroelastic instabilities at the transonically operating aircraft, the separation 23 of the boundary layer of the flow from the wing halves 6, which otherwise only occurs at higher transonic flight Mach numbers $M_\infty$, is already provoked at lower transonic flight Mach numbers $M_\infty$. In this way, the transonic dip 3 is pushed back in direction of an arrow 24 so that, for example, an increase of the flight Mach number $M_\infty$ of the aircraft along the curve 4 is possible up to the buffet Mach boundary 5 without approaching the flutter dynamic pressure boundary 2 in the area of the transonic dip 3. In other words, the Maximum normal Operation Mach number $M_{MO}$ for this and further altitudes in the flight envelope 1 according to FIG. 1 is shifted up to the buffet Mach boundary 5.

Figure 3:
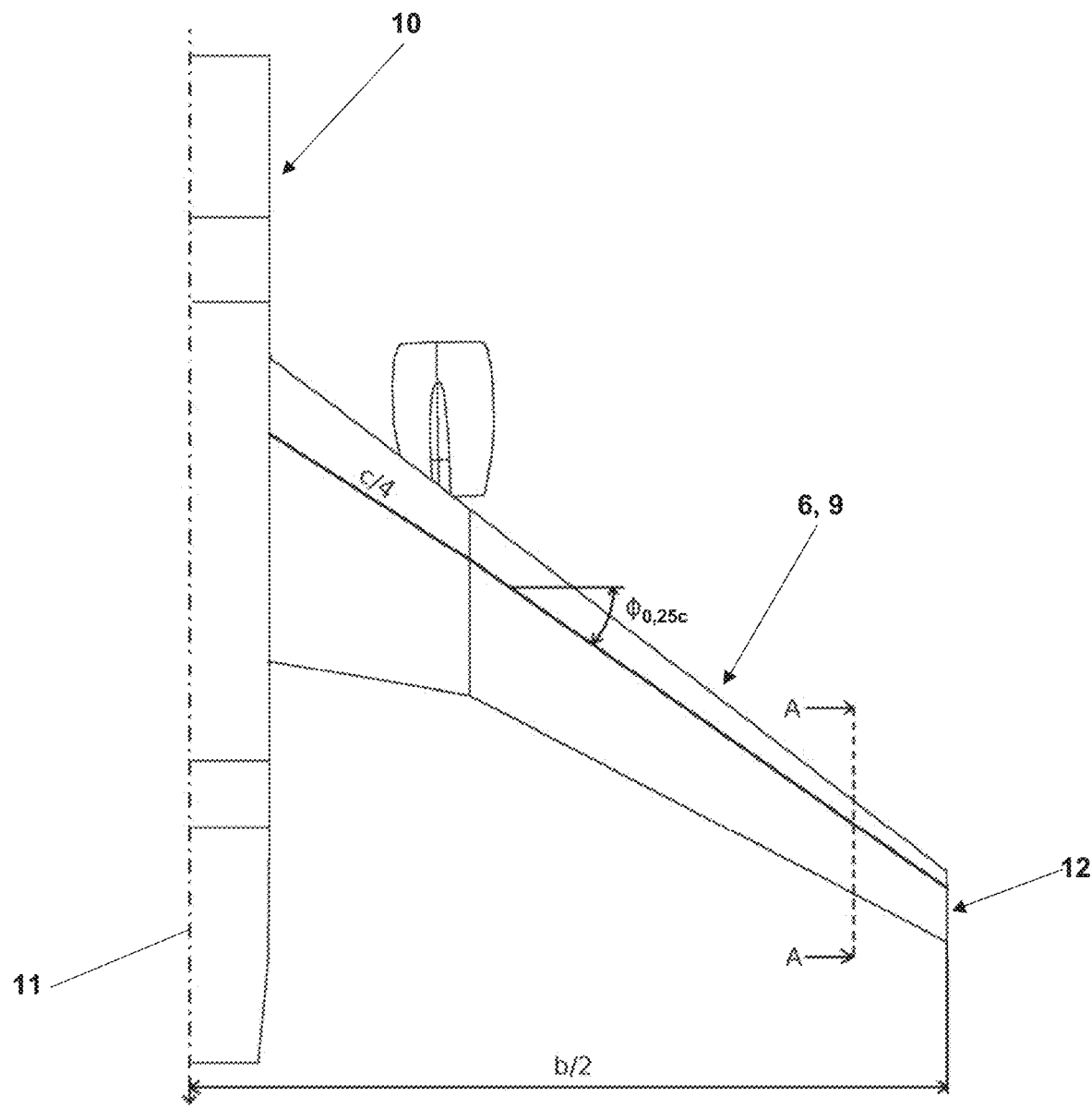
FIG. 3 shows a wing half of an aircraft in a view from above.

FIG. 3 shows a wing half 6 in form of an airfoil 9 of the aircraft 10 in a view from above, relevant dimensions of the aircraft and the airfoil 9 being indicated. These dimensions include the wing sweep $\Phi_{0.25c}$ at 25% of the relative profile depth which is 35° here. Further, the half wingspan b/2 from a vertical longitudinal center plane 11 of the aircraft 10 up to the wingtip 12 of the wing half 6 is indicated. With regard to the transonic flutter, the outer areas of the half wingspan b/2 closer to the wingtip 12 are of more importance, because larger variations of the angle of attack due to elastic deformations of the airfoil 9 occur here.

Figure 4:
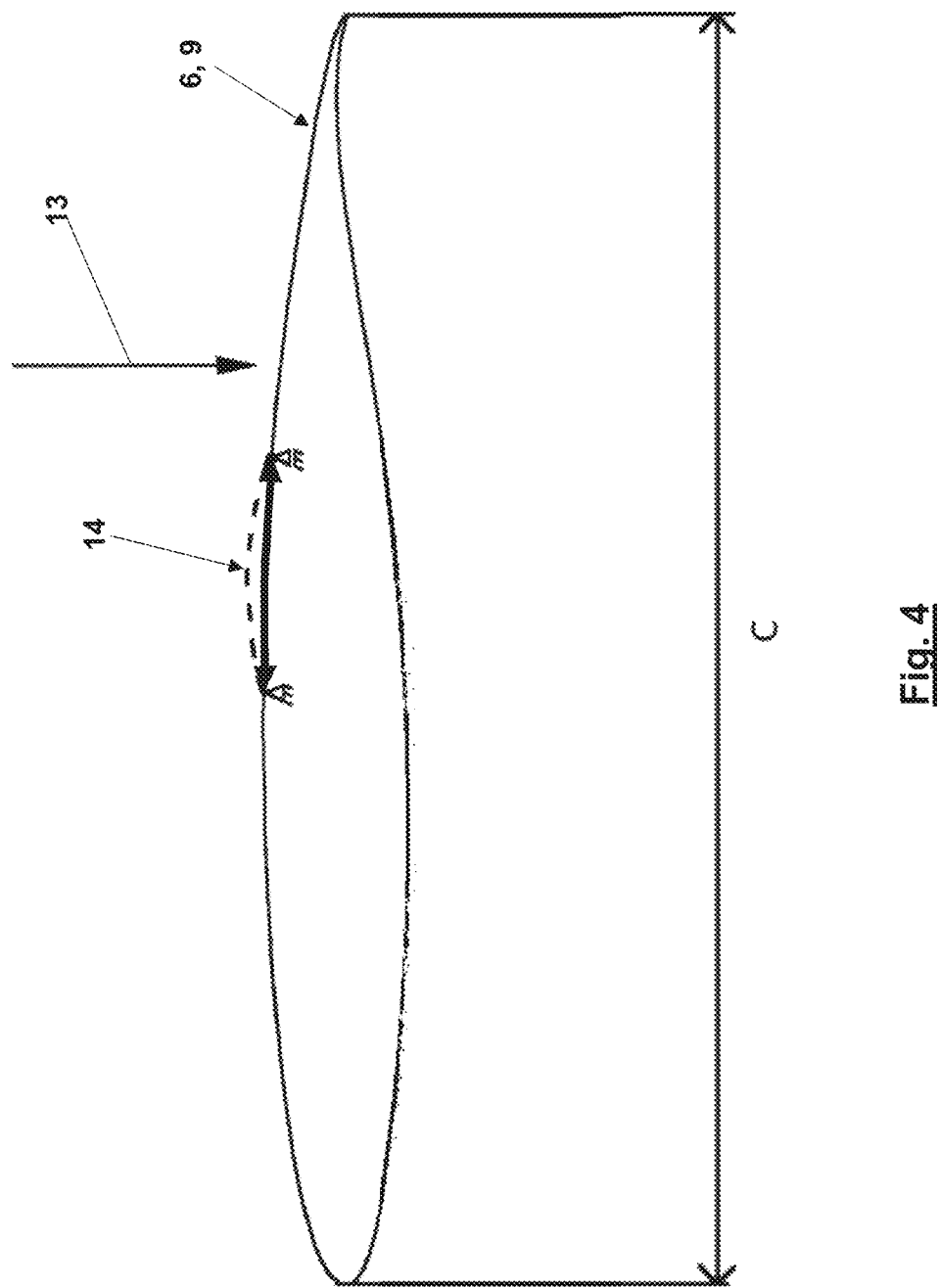
FIG. 4 is a section through the wing half according to FIG. 3.
Figure 5:
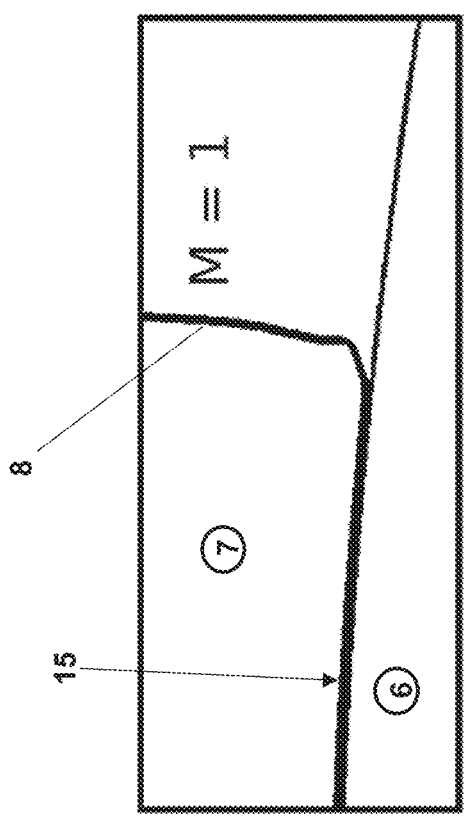
FIG. 5 shows an end of a supersonic flow region of a transonic flow over a wing half according to FIGS. 3 and 4 with a compression shock.

FIG. 4 shows a section along the section line A-A in FIG. 3 through the wing half 6 or the airfoil 9, i.e. it shows the profile of the airfoil 9 over the local profile depth c. The compression shock 8 according to FIG. 2 appears in a backward area of the profile depth c at the upper side of the airfoil 9 as indicated with an arrow 13. In the upstream supersonic flow region, the boundary layer of the flow over the airfoil 9 is thickened-up in an intervention area 14. Without thickening-up the boundary layer 15, the situation depicted in FIG. 5 arises, i.e. the compression shock 8 terminates the supersonic flow region 7 above the wing half 6 without a separation of the flow 15 from the surface of the wing half 6, and the compression shock 8, with increasing angle of attack a of the wing half 6 with respect to the incident flow, moves downstream in the direction of the profile depth c. This downstream movement of the compression shock 8 results in an elastic deformation of the wing half 6 which further increases the angle of attack a. In transonic flutter, this elastic deformation swings up due to the downstream movement of the compression shock 8 with increasing angle of attack a.

Figure 6:
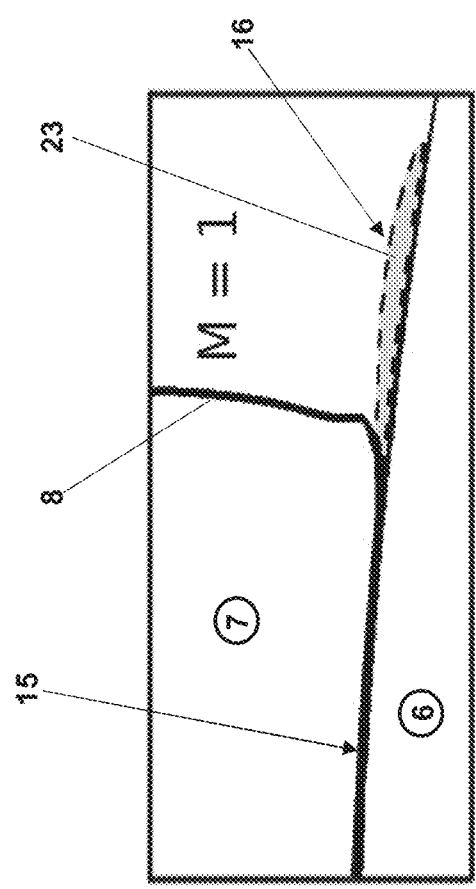
FIG. 6 shows a separation bubble over the wing half, which is induced by the compression shock according to FIG. 5 with a thickened-up boundary layer of the flow.

Due to the thickening-up of the boundary layer 15 the situation depicted in FIG. 6 arises in which the compression shock 8 at the end of the supersonic flow region 7 induces a separation of the boundary layer over a spatially limited separation bubble. This separation of the boundary layer results in an upstream movement of the compression shock 8 in direction of the profile depth c, i.e. in an opposite or inversed movement with respect to the downstream movement with increasing angle of attack which causes the transonic flutter. Thus, the coupling between the movement of the compression shock 8 and the variation of the angle of attack which results in an amplification of the deformation of the airfoil 9 is removed or at least reduced. Thus, the tendency of the airfoil 9 to flutter and correspondingly the depth of the transonic dip 3 of the critical flutter velocity according to FIG. 2 are reduced. This reduction comes with an increase of the aerodynamic drag. This, however, is acceptable if the boundary layer 15, as proposed here, is only actively thickened-up when approaching the flight envelope 1 according to FIG. 1, i.e. particularly when approaching the Maximum normal Operation Mach number $M_{MO}$.

Figure 7:
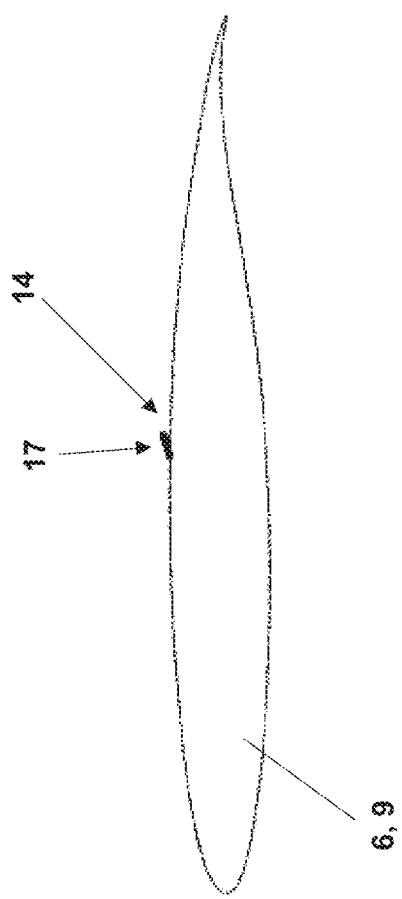
FIGS. 7 to 12 show different practical measures for thickening-up the boundary layer of the flow to achieve the effect depicted in FIG. 6.
Figure 8:
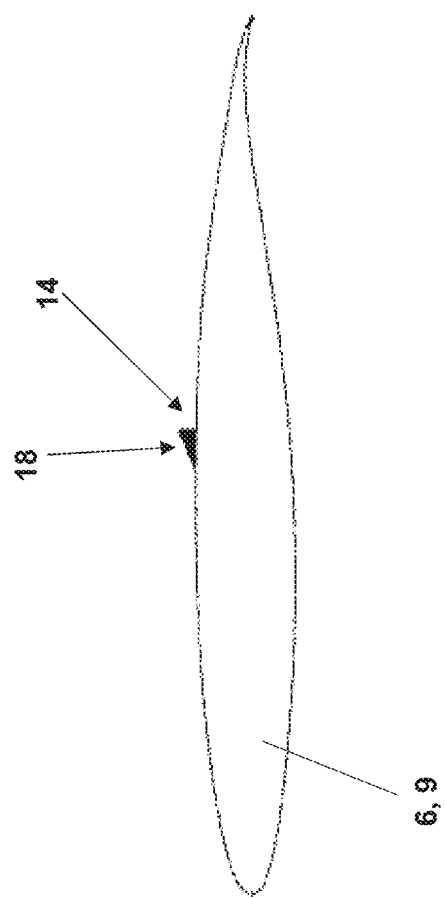
Figure 9:
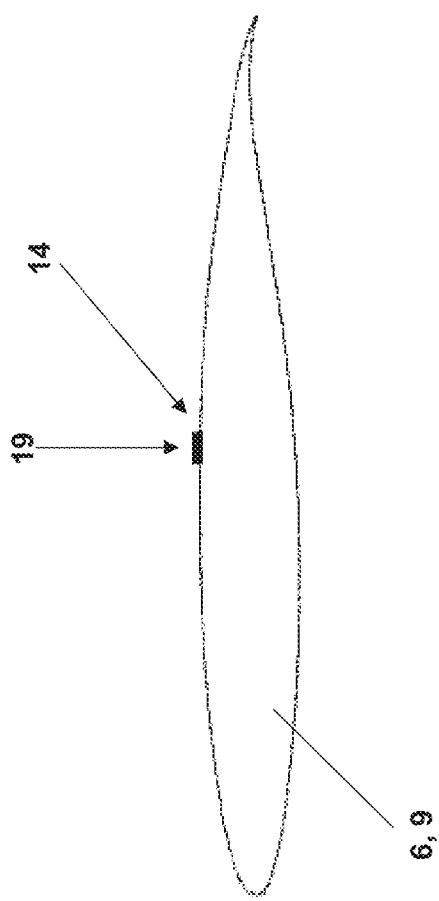
Figure 10:
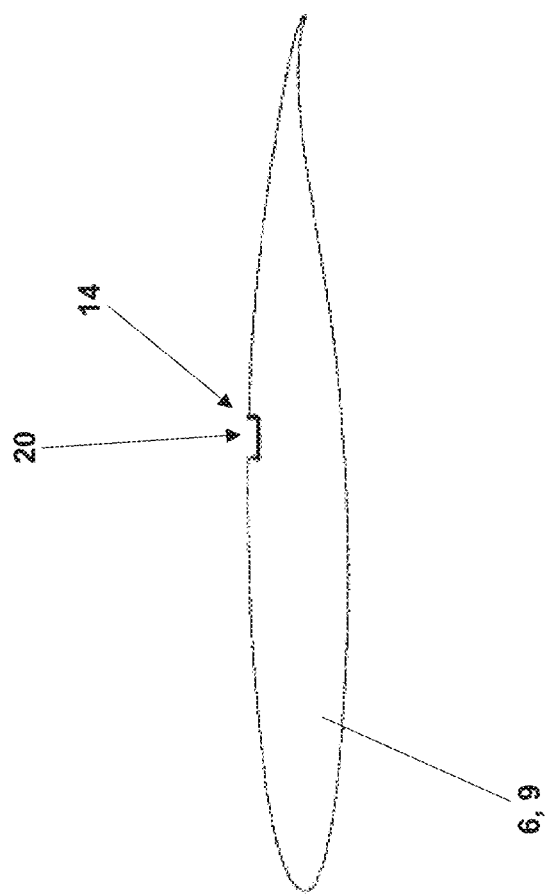
Figure 11:
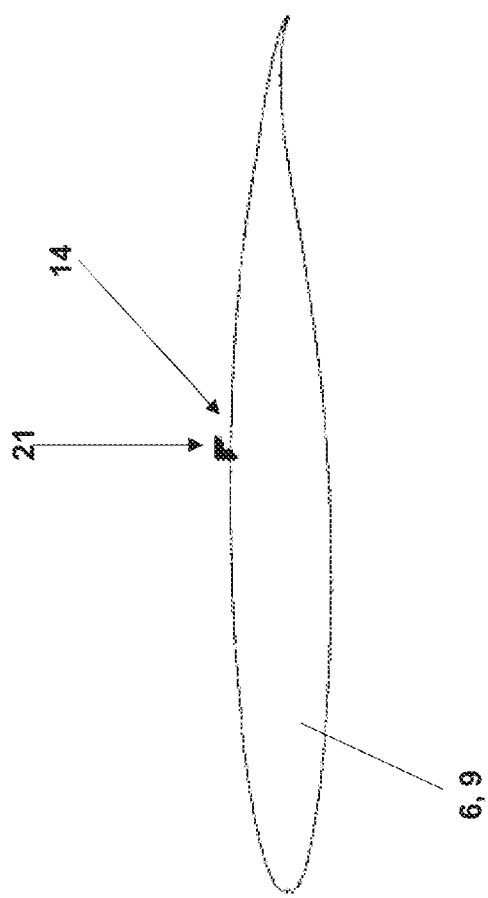
Figure 12:
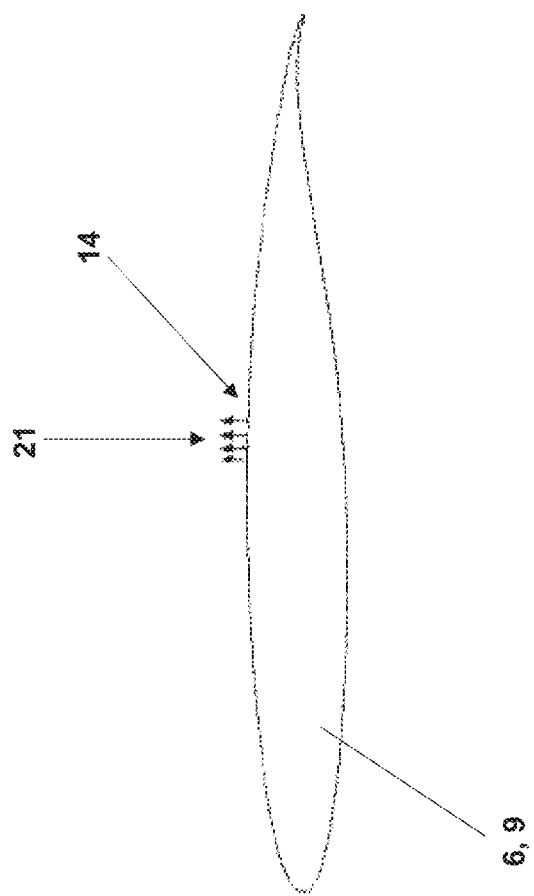

FIGS. 7 to 12 show different practical measures by which a suitable temporary thickening-up of the boundary layer at the wing half 6 is possible. FIG. 7 shows an extendable flap or an extendable spoiler 17. FIG. 8 shows an extendable profile triangle 18. FIG. 9 shows an extendable step 19. FIG. 10 shows a retractable step 20. FIG. 11 schematically shows an exploitable and/or activatable vortex generator 21. FIG. 12 illustrates blowing out 22 air into the boundary layer 15 of the flow, wherein the air is blown out in a direction normal to the main flow direction of the boundary layer 15 and particularly has a clearly lower average velocity in the main flow direction than the boundary layer 15 prior to the blowing out 22.

For the location of the intervention area 14 in which the measures of the FIGS. 7 to 12 are applied reference is made to the above description.

Many variations and modifications may be made to the preferred embodiments of the invention without departing substantially from the spirit and principles of the invention. All such modifications and variations are intended to be included herein within the scope of the present invention, as defined by the following claims.

We claim:
1. A method of suppressing aeroelastic instabilities on a transonically operating aircraft comprising a pair of wing halves that are configured so that a transonic flow forms spatially limited supersonic flow regions that each, in a main flow direction of the flow, end in a compression shock, the method comprising,
   providing devices for suppressing aeroelastic instabilities on the transonically operating aircraft, wherein the devices for suppressing aeroelastic instabilities are configured for, in at least one supersonic flow region at at least one of the two wing halves, thickening-up a boundary layer of the flow temporarily when approaching a flight envelope of the aircraft with increasing flight Mach number of the aircraft,
   wherein the devices for suppressing aeroelastic instabilities are configured to thicken up the boundary layer of the flow to such an extent that the compression shock at the end of the respective supersonic flow region at the present flight Mach number of the aircraft induces a separation of the boundary layer of the flow from the wing half, and wherein:
   the transonically operating aircraft has an aircraft model specific Maximum normal Operating Mach number $M_{MO}$ between 0.7 and 1.0; and
   the devices for suppressing aeroelastic instabilities comprise at least one of:
     air exit points distributed in wingspan direction which are connected to activatable air supply channels, wherein the air supply channels are connected to motor driven or aerodynamically operative pressurized air sources; or
     elements at the wing halves which can be activated into an aerodynamically effective position for thickening up the respective boundary layer, wherein the elements comprise activatable spoilers by which each respective wing half may be temporarily provided with a step extending crosswise with respect to the main flow direction and stepping back along the main flow direction.

2. The method of claim 1, wherein the boundary layer of the flow is thickened-up to such an extent that the boundary layer of the flow that separates from the respective wing half at a foot of the compression shock at the end of the respective supersonic flow region re-attaches to the respective wing half downstream of the compression shock in the main flow direction.

3. The method of claim 2, wherein the boundary layer of the flow re-attaches to the wing half for at least 5% of a local profile depth c of the respective wing half upstream of a trailing wing edge of the respective wing half.

4. The method of claim 1, wherein the boundary layer of the flow is thickened-up to such an extent that an aerodynamic drag of the one of the two wing halves is increased.

5. The method of claim 1, wherein the boundary layer of the flow is thickened-up to such an extent that at least one of
an average velocity of the flow parallel to the surface of the respective wing half,
a velocity of the flow parallel to the surface of the respective wing half at a half thickness of the boundary layer and
an average kinetic energy of the flow in the boundary layer is reduced.

6. The method of claim 1, wherein the boundary layer of the flow is thickened-up by means of at least one of
slowing down the flow parallel to the surface of the respective wing half within the boundary layer and
injecting an additional amount of air with lower velocity parallel to the surface of the respective wing half into the boundary layer.

7. The method of claim 1, wherein the boundary layer of the flow is thickened-up in an outer half of a half wingspan of the one of the wing halves when viewed in wingspan direction.

8. The method of claim 1, wherein the boundary layer is thickened-up within an intervention area which extends over 5% to 50% of a half wingspan of the respective wing half.

9. The method of claim 1, wherein the boundary layer is thickened-up
at a low pressure side of the respective wing half within a profile depth area from 40% to 85% of a local profile depth c of the respective wing half behind a leading wing edge of the respective wing half, or
at a high pressure side of the respective wing half within a profile depth area from 5% to 50% of the local profile depth c of the respective wing half behind a leading wing edge of the respective wing half.

10. The method of claim 1, wherein the boundary layer of the flow is thickened-up by at least 5% and by at maximum 30% of its thickness prior to being thickened-up.

11. The method of claim 1, wherein the boundary layer of the flow is thickened-up to a thickness in a range from 5 mm to 100 mm.

12. The method of claim 1, wherein the boundary layer of the flow is thickened-up in the supersonic flow regions on the same side of each of the two wing halves or only in one of the supersonic flow regions on one side of one of the two wing halves.

13. The method of claim 1, wherein the boundary layer of the flow is thickened-up at a flight Mach number in a range from 0.5 to 1.0.

14. The method of claim 1, wherein the devices for suppressing aeroelastic instabilities comprise:
air exit points distributed in wingspan direction which are connected to activatable air supply channels, wherein the air supply channels are connected to motor driven or aerodynamically operative pressurized air sources.

15. The method of claim 1, wherein the devices for suppressing aeroelastic instabilities comprise:
elements at the wing halves which can be activated into an aerodynamically effective position for thickening up the respective boundary layer, wherein the elements comprise activatable spoilers by which each respective wing half may be temporarily provided with a step extending crosswise with respect to the main flow direction and stepping back along the main flow direction.

16. An aircraft comprising:
a pair of wing halves that are configured so that a transonic flow forms spatially limited supersonic flow regions that each end in a compression shock in a main flow direction of the flow, and
devices for suppressing aeroelastic instabilities on the transonically operating aircraft,
wherein the devices for suppressing aeroelastic instabilities are configured for automatically thickening-up a boundary layer of the flow in at least one of the supersonic flow regions at at least one of the two wing halves to such an extent that the compression shock at the end of the respective supersonic flow region induces a separation of the boundary layer from the wing half at the present flight Mach number of the aircraft, and wherein:
the transonically operating aircraft has an aircraft model specific Maximum normal Operating Mach number $M_{MO}$ between 0.7 and 1.0, and
the devices for suppressing aeroelastic instabilities comprise at least one of:
air exit points distributed in wingspan direction which are connected to activatable air supply channels, wherein the air supply channels are connected to motor driven or aerodynamically operative pressurized air sources; or
elements at the wing halves which can be activated into an aerodynamically effective position for thickening-up the respective boundary layer, wherein the elements comprise activatable spoilers by which each respective wing half may be temporarily provided with a step extending crosswise with respect to the main flow direction and stepping back along the main flow direction.

17. The aircraft of claim 16, wherein the aircraft comprises at least one of the following features:
a wing sweep $\Phi_{0.25}c$ at 25% of the relative profile depth c of the respective wing half of more than −40° and less than 40°,
an aspect ratio $A=b^2/S$ of the wing halves higher than 6, wherein b/2 is a half wingspan and S/2 is a wing area of the respective wing half, and
an aircraft model specific Maximum normal Operating Mach number $M_{MO}$ between 0.7 and 1.0.

18. The aircraft of claim 16, wherein the devices for suppressing aeroelastic instabilities comprise air exit points distributed in wingspan direction which are connected to activatable air supply channels, wherein the air supply channels are connected to motor driven or aerodynamically operative pressurized air sources.

19. The aircraft of claim 16, wherein the devices for suppressing aeroelastic instabilities comprise elements at the wing halves which can be activated into an aerodynamically effective position for thickening-up the respective boundary layer.

20. The aircraft of claim 16, wherein the aircraft comprises active flutter suppression devices which are configured for actively suppressing a flutter of the wing halves, wherein the devices for suppressing aeroelastic instabilities are configured for thickening-up the boundary layer if the active flutter suppression devices fail or are insufficient to avoid an approach to the flight envelope.

21. The aircraft of claim 16, wherein the devices for suppressing aeroelastic instabilities are configured to recognize an approach to the flight envelope by comparing present flight parameters with a stored description of the flight envelope.

22. The aircraft of claim 16, wherein the devices for suppressing aeroelastic instabilities are configured to recognize an approach to the flight envelope by evaluating signals from vibration sensors which detect vibrations of the wing halves in a frequency range from 1 Hz to 25 Hz.

23. The aircraft of claim 16, wherein the devices for suppressing aeroelastic instabilities comprise:
   air exit points distributed in wingspan direction which are connected to activatable air supply channels, wherein the air supply channels are connected to motor driven or aerodynamically operative pressurized air sources.

24. The aircraft of claim 16, wherein the devices for suppressing aeroelastic instabilities comprise:
   elements at the wing halves which can be activated into an aerodynamically effective position for thickening up the respective boundary layer, wherein the elements comprise activatable spoilers by which each respective wing half may be temporarily provided with a step extending crosswise with respect to the main flow direction and stepping back along the main flow direction.

* * * * *